United States Patent [19]

Hermann et al.

[11] 4,091,793
[45] May 30, 1978

[54] SOLAR COLLECTOR

[75] Inventors: Wilhelm Hermann; Horst Hörster, both of Roetgen, Germany

[73] Assignee: U.S. Philips Corporation, New York, N.Y.

[21] Appl. No.: 678,868

[22] Filed: Apr. 21, 1976

[30] Foreign Application Priority Data

May 17, 1975 Germany .............................. 2522160

[51] Int. Cl.² .............................................. F24J 3/02
[52] U.S. Cl. .................................... 126/270; 126/271
[58] Field of Search ............... 126/270, 271; 237/1 A; 428/434, 469

[56] References Cited

U.S. PATENT DOCUMENTS

| | | | |
|---|---|---|---|
| 1,801,710 | 4/1931 | Abbot | 126/271 |
| 3,957,029 | 5/1976 | Nozik | 126/271 |
| 3,974,822 | 8/1976 | Patil | 126/271 |
| 3,978,272 | 8/1976 | Donley | 126/271 |
| 3,981,293 | 9/1976 | Gillery | 126/271 |
| 3,981,294 | 9/1976 | Deminet et al. | 126/271 |

Primary Examiner—Kenneth W. Sprague
Assistant Examiner—James C. Yeung
Attorney, Agent, or Firm—Frank R. Trifari; Rolf E. Schneider

[57] ABSTRACT

A solar collector comprising an absorber and a heat-insulating transparent cover which consists of a number of sealed and evacuated glass tubes adjacently arranged in contact with each other, at least the lower half of the inner surface of each glass tube being provided with an infrared-reflecting layer.

4 Claims, 4 Drawing Figures

SOLAR COLLECTOR

This invention relates to a solar collector, comprising an absorber for tansferring heat from incident solar radiation to a transport medium, and a heat-insulting transparent cover which separates the absorber from the ambient atmosphere.

Solar collectors serve to convert the major part of the radiation spectrum of sunlight into heat and to exchange this heat with a transport medium, for example, water, with an efficiency as high as possible. In order to achieve a high level of efficiency, solar collectors should have the following properties:

a. good absorption (absorption factor $\alpha \geqq 0.9$) over the whole solarspectrum ($\lambda = 0.3$ to 2 microns)
b. low emission (emission factor $\epsilon \geqq 0.3$) in the range of the heat radiation ($\lambda = 3$ to 30 microns)
c) low heat losses due to heat conduction and convection
d. low thermal capacity.

In order to satisfy condition (c) at elevated operating temperatures, a vacuum insulation is required. Known solar collectors comprise an absorber in the form of a duct which is filled with the transport medium and which is enveloped by an evacuated glass tube. The glass tube is covered by an infrared reflecting layer, so that it properly transmits the incident solar radiation, but reflects the infrared radiation emitted by the absorber, thus reducing radiation losses. Solar collectors are also known whose tube-shaped absorber, filled with heat-exchange medium is arranged in a kind of Dewar vessel. In both cases the tube-like absorbers must extend out of a glass tube in a sealed vacuum system. This is difficult and complex.

One object of the invention is to provide a solar collector which does not require sealed vacuum passages and complex structural parts of glass.

According to the present invention there is provided a solar collector of the aforesaid kind characterized in that the cover consists of a number of sealed and evacuated glass tubes which are adjacently arranged in contact with each other.

Evacuated glass tubes can be manufactured without difficulty.

In horizontal operating position the glass tubes preferably bear directly on the absorber in order to reduce convection losses. In inclined or vertical operating position the glass tubes, however, are preferably situated at a distance of from 2 to 25 mm from the absorber.

The evacuated glass tubes can be freely arranged one adjacent the other. However, they are preferably rigidly connected to each other by gluing or fusion.

Preferably, the diameter of the individual glass tubes is between 2 to 20 cm; however, if desired the diameter may also be substantially larger. For a given tube diameter, the wall thickness of the tube should be kept to a minimum and be limited only by the mechanical strength of the tube. In order to increase the mechanical strength of the glass tubes, they can be provided on their outer surfaces with a layer of transparent enamel. The enamel should have a low absorption in the spectral range of solar radiation, and be UV-resistant, have a refractive index smaller than 1.4, and be reflective for wavelengths $\lambda > 2.5$ microns. These conditions are satisfied, for example, by silicon enamels.

The glass tubes are preferably provided with an infrared reflecting layer over at least part of their inner surfaces. Suitable infrared reflecting layers are made of silver, gold or tin oxide, but are preferably of indium oxide.

In order to increase the transmission of the glass tubes for incident solar radiation, they can be provided on their inner surfaces with a reflection-reducing layer in accordance with the invention, the said layer satisfying the condition:

$$n \cdot d = \lambda/4,$$

in which
$n$ = the refractive index of the layer;
$d$ = the thickness of the layer, and
$\lambda$ = 0.6 micron.

Reflection-reducing layers of this kind can be made of cryolite ($Na_3AlF_6$) magnesium fluoride ($MgF_2$) or an oxide of silicon ($SiO_x$, $SiO_2$).

The reflection-reducing layer is effectively provided on the infrared reflecting layer.

In a preferred embodiment of the solar collector in accordance with the invention, convection reducing foils are provided in contact with the glass tubes at the junction of each pair of tubes, which foils extend to absorber. These foils can be made, for example, of aluminium, a synthetic material or glass.

In a further preferred embodiment of the solar collector in accordance with the invention, the glass tubes are covered by a glass plate. The space between the tubes and the glass plate can be filled with either dry air or a gas having a lower thermal conductivity than air. Excellent thermal insulation is thus obtained.

The absorber preferably comprises a flat metallic plate whose surface is either non-selectively blackened ($\alpha \approx 1$; $\epsilon \approx 1$) or is blackened and has a low emission factor ($\alpha \geqq 0.9$; $\epsilon \leqq 0.3$) for heat radiation.

Preferred embodiments in accordance with the invention will be described in detail hereinafter with reference to the drawing, in which.

Figure 1:
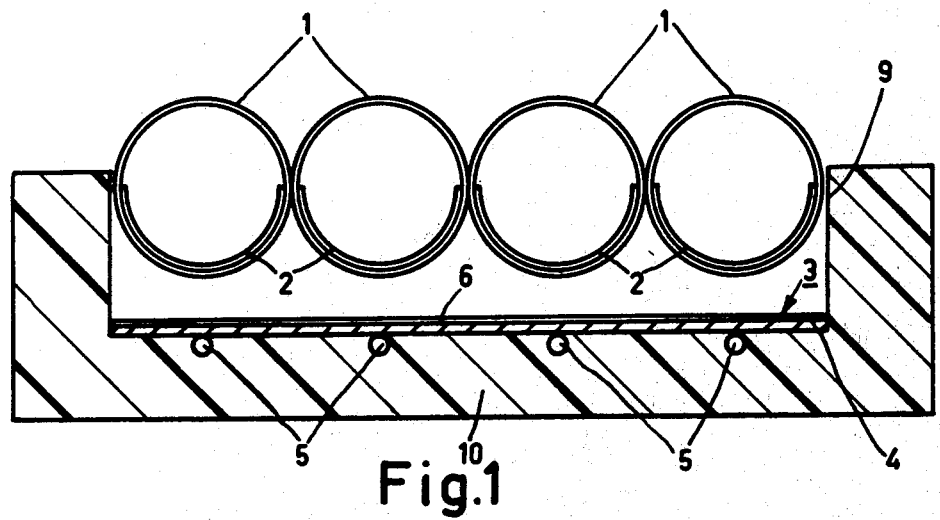
FIGS. 1 and 2 are cross-sectional views of solar collectors in accordance with the invention.

The solar collectors in accordance with the invention comprise a plurality of glass tubes 1 which are adjacently arranged in contact with each other and which are evacuated and sealed on their ends. The glass tubes 1 can be freely arranged adjacent each other, or alternatively they can be interconnected for example by gluing or by fusion or by otherwise fixing the tubes together. The glass tubes 1 are provided on their inner surfaces with an infrared reflecting layer 2, for example, of In$_2$O$_3$. In the solar collector shown in FIG. 1, the infrared reflecting layers 2 extend only over the lower half of the glass tubes 1, whilst in the solar collectors shown in FIGS. 2 to 4, the inner surfaces of the glass tubes 1 are fully covered by a layer of infrared reflecting material.

Each absorber 3 consists of a flat metallic plate 4 which contacts tubular ducts 5 for a heat transport medium, for example, water, and which includes an absorption surface 6. This absorption surface 6 is either non-selective ($\alpha \approx 1$, $\epsilon \approx 1$) or is blackened and has a low emission factor ($\alpha \geqq 0.9$; $\epsilon \leqq 0.3$) for thermal radiation. The glass tubes 1 are arranged at a distance of from 2 to 25 mm from the absorber 3.

In FIG. 1, the glass tubes 1 and the absorber 3 are accommodated in a cabinet-like housing 9, the rear of which is thermally insulated by means of an insulating material 10.

Figure 3:
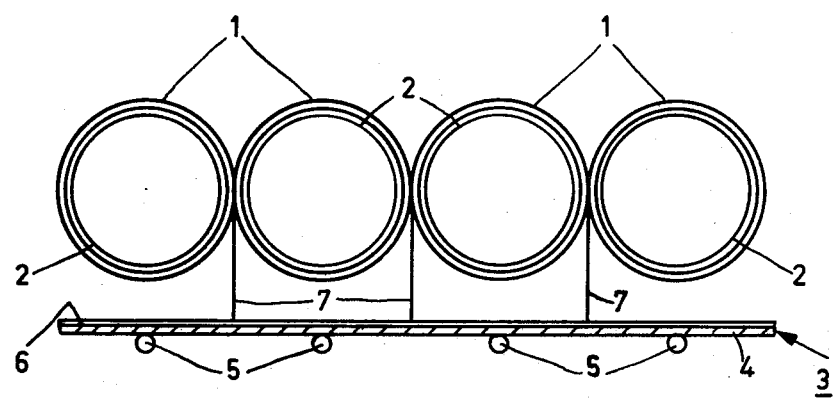
FIG. 3 shows a solar collector in accordance with the invention which includes convection reducing foils.

In the solar collector shown in FIG. 3, foils 7 are arranged which extend from the junctions of each pair of glass tubes to the absorber 3, the said foils serving to suppress convection between the glass tubes and the absorber and being made, for example, of aluminium, a synthetic material or glass.

Figure 4:
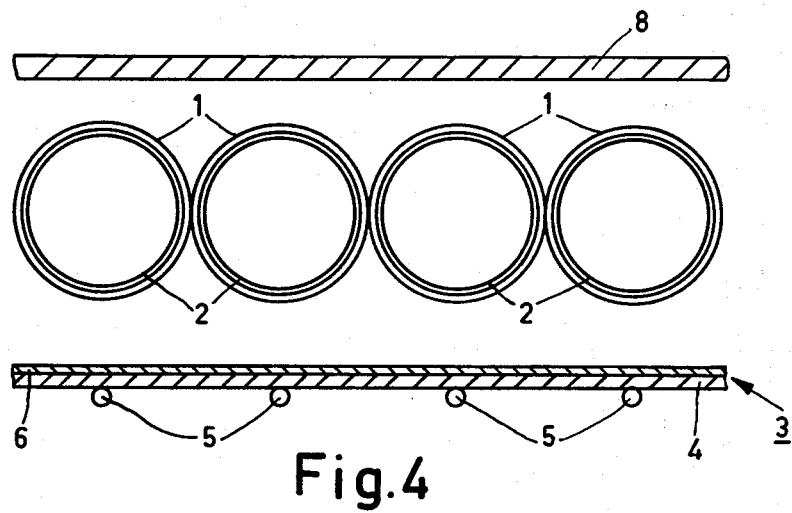
FIG. 4 shows a solar collector in accordance with the invention which includes an additional glass plate.

The glass tubes 1 of the solar collector shown in FIG. 4 are covered by a glass plate 8.

The inner surface of each glass tube 1 of the solar collectors can be provided with a reflection-reducing layer (not shown) which is preferably deposited on the infrared reflecting layer 2. In order to increase the mechanical strength, the outer surface of the glass tubes can furthermore be provided with a transparent enamel layer (not shown).

Figure 2:
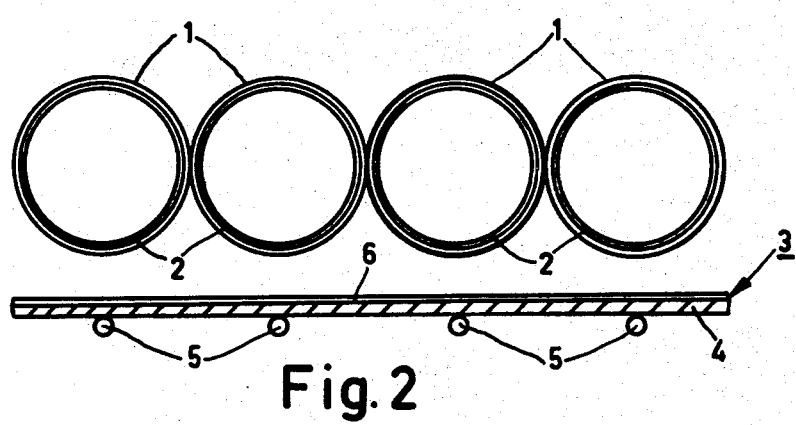

In a practical embodiment of a solar collector as shown in FIG. 2, the diameter of the glass tube 1 is 65 mm, with a wall thickness of 1.2 mm and a length of 100 cm. The infrared-reflecting layer, is made of indium oxide and has a thickness of 0.3 micron. The absorber 3 comprises a metallic plate 4 of copper, having a thickness of 2 mm. The absorber surface 6 consists of a black layer (for example, Aquadakt) having a thickness of approximately 0.2 mm and has an absorption factor $\alpha = 0.95$ and an emission factor $\epsilon = 0.8$. The distance between the glass tubes 1 and the absorber 3 is 20 mm.

Under normal central European sunlight conditions, water in the transport ducts 5 of such a collector can be heated to a temperature of 100° C.

In a practical embodiment of a solar collector as shown in FIG. 3, the foils 7 are made of PVC or Teflon and have a thickness of from 10 to 100 microns. The introduction of these foils increases the efficiency by about 10% with respect to the solar collector shown in FIG. 2.

What is claimed is:

1. A solar collector comprising an absorber for transferring heat from incident solar radiation to a transport medium, and a heat-insulating transparent cover separating the absorber from the ambient atmosphere and consisting of a plurality of sealed and evacuated glass tubes adjacently arranged in contact with each other, at least the lower half of the inner surface of each glass tube being provided with an infrared-reflecting layer, the inner surface of each glass tube also being provided on the infrared-reflecting layer with a reflection-reducing layer satisfying the condition $$n \cdot d = \lambda/4,$$

wherein
$n =$ the refractive index of the reflection-reducing layer;
$d =$ the thickness of the reflection-reducing layer; and
$\lambda = 0.6$ micron.

2. A solar collector according to claim 1, in which the reflection-reducing layer is made of cryolite, magnesium fluoride or an oxide of silicon.

3. A solar collector according to claim 1, in which the outer surface of each glass tube is covered by a transparent layer of enamel.

4. A solar collector according to claim 1, which includes a convection-reducing foil extending from the junction of each pair of glass tubes to the absorber.

* * * * *